United States Patent [19]
Keuper

[11] Patent Number: 5,929,389
[45] Date of Patent: Jul. 27, 1999

[54] DEVICE AND METHOD FOR DETERMINING WEIGHT OF A LOAD

[75] Inventor: Gerhard Keuper, Leonberg, Germany

[73] Assignee: Robert Bosch GmbH, Stuttgart, Germany

[21] Appl. No.: 09/112,892

[22] Filed: Jul. 9, 1998

[30] Foreign Application Priority Data

Jul. 19, 1997 [DE] Germany ............................ 197 31 089

[51] Int. Cl.⁶ .................................................. G01G 19/10
[52] U.S. Cl. .............................. 177/141; 701/50; 702/174
[58] Field of Search ..................................... 177/136, 139, 177/141; 701/50; 702/173, 174, 175

[56] References Cited

U.S. PATENT DOCUMENTS

| | | | |
|---|---|---|---|
| 4,499,960 | 2/1985 | Ehrich et al. | 177/141 |
| 4,627,013 | 12/1986 | Ichiyama et al. | 177/141 |
| 4,645,018 | 2/1987 | Garbade et al. | 177/139 |
| 4,691,792 | 9/1987 | Shintani | 177/141 |
| 4,807,136 | 2/1989 | Rutkowski et al. | 701/50 |
| 4,995,468 | 2/1991 | Fukuda | 177/141 |
| 5,167,287 | 12/1992 | Pomies | 177/141 |
| 5,178,226 | 1/1993 | Bowman et al. | 177/139 |
| 5,245,137 | 9/1993 | Bowman et al. | 177/139 |
| 5,509,293 | 4/1996 | Karumanchi | 177/141 |
| 5,714,719 | 2/1998 | Otsuka et al. | 177/141 |
| 5,824,965 | 10/1998 | Fujii et al. | 177/136 |

FOREIGN PATENT DOCUMENTS

| | | |
|---|---|---|
| 0 496 869 B1 | 4/1995 | European Pat. Off. . |
| 38 20 757 A1 | 12/1989 | Germany . |

*Primary Examiner*—Randy W. Gibson
*Attorney, Agent, or Firm*—Michael J. Striker

[57] ABSTRACT

The device (10) for determining a weight of a load in a working vehicle has a link device (12) including an upper link member (16), a lower link member (17) and a load holder (15) that moves the load up and down by means of a hydraulic cylinder (21) so that a height of the load is variable or adjustable, a pressure sensor for generating a pressure signal depending on the hydraulic pressure in the hydraulic cylinder (21) and a position sensor for generating a position signal depending on the position of the link device relative to the working vehicle. From the signals of both sensors and also, optionally, signals from a pitch sensor measuring the pitch angle of the working vehicle, a processor (26) determines the size of the suspended load (11) and its weight change, since it determines measured values sets for three unknown variables, weight (G) and center of gravity position ($r_{SP}$, $\alpha_{SP}$), advantageously in at least three different measurement configurations or positions of the link device (12). The weight (G) and its change may be determined in the traveling working vehicle.

20 Claims, 7 Drawing Sheets

DEVICE AND METHOD FOR DETERMINING WEIGHT OF A LOAD

BACKGROUND OF THE INVENTION

The present invention relates to a device and method for determination of the weight of a load that is linked to a working vehicle with the aid of a link device operable by a hydraulic cylinder so that the height of the load is variable. The device for weight determination includes a pressure sensor operating as a load-dependent sensor to determine the hydraulic pressure in the hydraulic cylinder and to generate a first signal depending on that hydraulic pressure and a position sensor to determine a position of the link device relative to the working vehicle and generate a second signal depending on that position.

A device for weight determination of a load is already known from German Patent Document DE 38 20 757, in which the weight of equipment connected to a tractor with an electro-hydraulic lifting device controller by means of an adjustable height 3-point link device is determined. A pressure sensor is used in this apparatus as load-dependent sensor for the weight determination. The pressure sensor measures the hydraulic pressure in a hydraulic cylinder used to raise and lower the load via the link device. In this type of device the center-of-mass position of the equipment, which could be a fertilizer spreader, for example, with material to be scattered, connected to the tractor by means of the lifting or link device is usually not known. Because of the torque that the weight exerts due to a displaced center of mass on the lifting device, a force must be applied by the hydraulic cylinder in general that supports both the force of the load and also the torque component due to the load. However the components are not separable from each other in the weight determination by measurement of the hydraulic cylinder pressure because of the unknown center of gravity position. This torque is obtained exclusively from the link members alone with the upper and lower link members of the link device in a parallel position. Because of this the link members in the link device start from a parallel position in the weight determination. The increase between the hydraulic cylinder pressure in the cylinder and a known empty weight of the attached equipment is determined by measuring the pressure in this position. The load weight is then determined with the aid of this value, however the link members must remain parallel during the measurement. However this is disadvantageous because the upper and lower link members of the link device are parallel only in a few cases when the equipment is connected in series with the link device so that the optimum prerequisites for weighing are not present in the tractor.

A device for weight determination of a load is also known from European Patent Document EP 0 496 869, in which a shovel or scoop is connected to the front side of a wheel loader by means of a hydraulic link device. A first signal of a pressure sensor arranged in a hydraulic cylinder and a second signal from a sensor detecting a position and/or geometry of the link device is used for weight determination, from which a correction value for the pitch of the working vehicle is determined and used for weight determination. It is disadvantageous that the pitch of the working vehicle is only derived in indirect form for weight determination so that high accuracy requirements are not fulfilled. Also calibrations with an empty shovel and with a predetermined load must be performed which increases the amount of work required for weight determination. An accurate calculation of the load is not possible in practice with this device, since approximation methods are used.

SUMMARY OF THE INVENTION

It is an object of the present invention to provide an improved device for determination of the weight of a load, especially a load that is connected to a working vehicle, particularly a traveling tractor that does not have the above-described disadvantages.

It is another object of the present invention to provide an improved method for determining the weight of a load, especially a load that is carried by or connected to a working vehicle, especially a traveling tractor, which does not have the above-described disadvantages.

According to the invention the device for determining a weight of a load in a working vehicle includes means for upward and downward displacement of the load comprising a hydraulic cylinder and a link device, this link device including link members and a holder for the load and connecting the load with the working vehicle and being operable by means of the hydraulic cylinder so that a height of the load is adjustable;

pressure sensor means for determining hydraulic pressures in the hydraulic cylinder and for generating pressure signals depending on the hydraulic pressures and thus the load;

position sensor means for determining positions of the link device relative to the working vehicle and for generating position signals depending on the positions; and processor means for determining respective sets of measured variables from at least two of the signals depending on pressures and positions in at least two different measurement positions of the link device and for determining at least two unknown values for a load weight and for a center-of-mass position of the load from the respective sets of measured variables. The processor means includes means for determining the at least two unknown values from the at least two signals and from predetermined geometric dimensions of the link device and holder by means of an equation for equilibrium of forces and torque on one of the link members of the link device.

The device according to the invention for determining a weight of the load has the advantage that the weight may be determined in an arbitrary link device configuration or position. Because this device is based on measurement and evaluation principals for any arbitrary pairs of link device and weighing device or load holder with general kinematics, the weight determination of the load is possible in any arbitrary position. No limitations regarding the geometry of the connected link device are required. The weight and the connected changes in the resulting center-of-mass position can be determined with continuously changing weights within certain weight change limits. Expenses for sensors are thus kept small.

There are several preferred embodiments of the device according to the invention set forth in the appended dependent claims. The accuracy of the method can be increased with minimal expense by increasing the number of different measurement positions used so that in a preferred embodiment at least three different measurement positions are used to obtain the respective sets of measured variables used to the obtain the at least two unknown values of the weight of the load and the center-of-mass position. It is also advantageous to include a pitch sensor that measures the longitudinal inclination angle of the working vehicle to the horizontal and to use the signals from the pitch sensor in addition to the pressure and position signals to obtain the respective sets of measured variables.

Similarly, the method of determining a weight of a load in a working vehicle according to the invention includes:

a) providing means for upward and downward displacement of the load comprising a hydraulic cylinder and a link device, this link device including link members and a holder for the load and connecting the load with the working vehicle and the link device being operable by means of the hydraulic cylinder so that a height of the load is adjustable;

b) generating pressure signals according to hydraulic pressures in the hydraulic cylinder, and thus the load, by means of a pressure sensor;

c) generating position signals according to positions of the link device relative to the working vehicle by means of a pressure sensor;

d) determining respective sets of measured values from at least two signals depending on the pressures and the positions in at least two different measurement positions of the link device; and e) determining at least two unknown values for a weight of the load and for a center-of-mass position ($r_{SP}$, $\alpha_{SP}$) of the load from measure values sets and from predetermined geometric dimensions of the link device with the holder by means of an equation for equilibrium of forces and torque on one of the link members of the link device.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
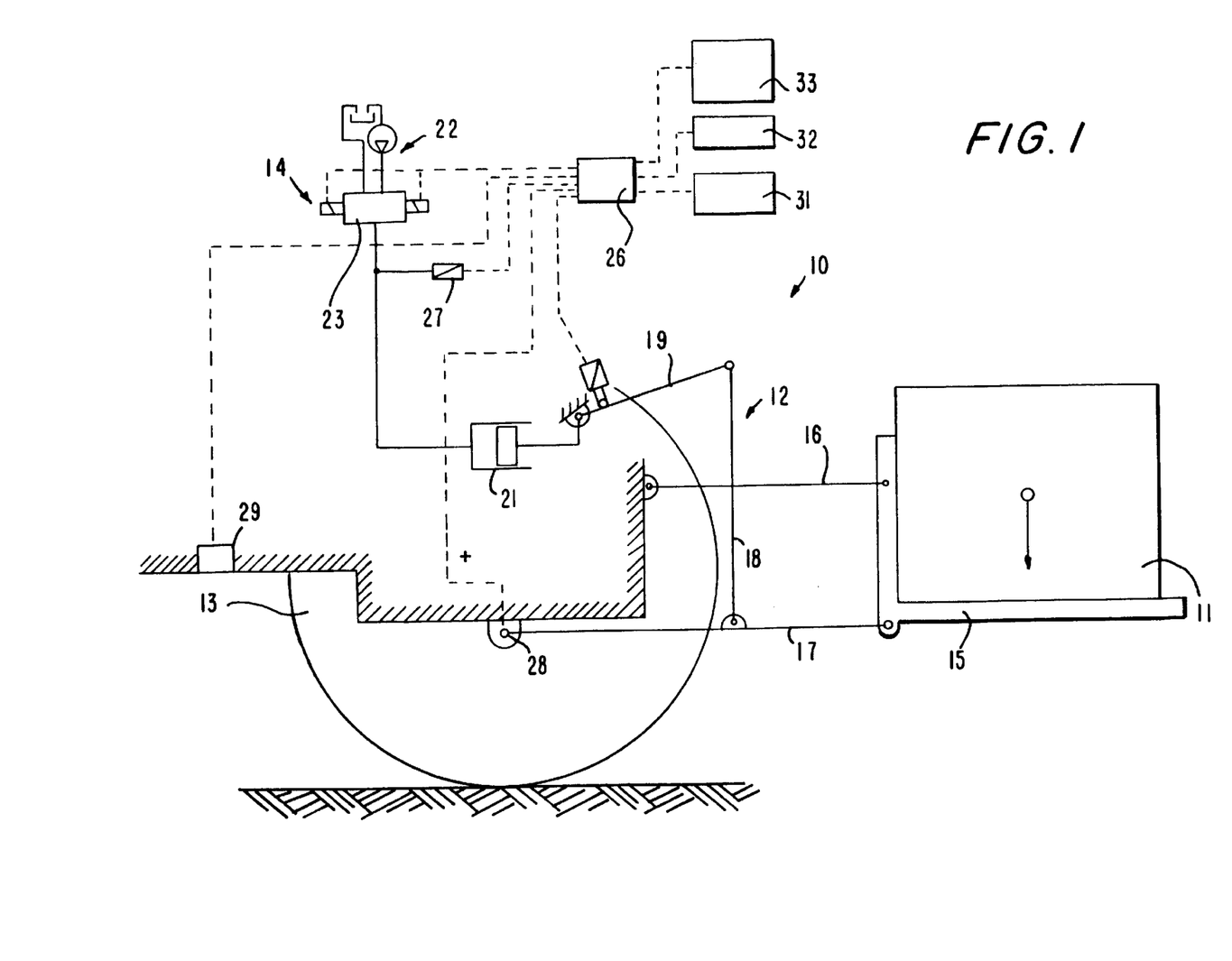
FIG. 1 is a simplified diagrammatic representation of a device according to the invention for determination of the weight of a suspended load.

FIG. 1 is a simplified representation of a device 10 for determination of the weight of a suspended load, that is pivotally mounted on the rear side of a working vehicle, here a tractor 13, in a known way by means of an electro-hydraulically operable 3-point controller link device. The controller link device 12 is part of an electro-hydraulic lifting device controller 14, in which the device 10 for weight determination is substantially integrated.

The load 11 whose weight should be measured is placed on the holder 15, which is pivotally mounted on the tractor 13 by means of an upper link member 16 and two lower link members 17, of which only one is shown. A lifting rod 18, which is operable by means of a lifting arm 19 of a hydraulic cylinder 21, is connected to the lower link member 17 for displacement of the load holder 15. The hydraulic cylinder 21 is controllable in a known manner with a hydraulic circuit by operation of an electro-hydraulic regulating valve 23.

The regulating valve 23 is controlled by an electronic control unit 26 that is supplied with signals from suitable sensors for performing the customary lifting device control. This control unit 26 that has appropriate microprocessors for operation of the device 10 for determination of the weight of a suspended load is supplied a first signal of a pressure sensor 27 which determines the hydraulic pressure in the hydraulic cylinder 21. The electronic control unit 26 is supplied with a second signal of an angle sensor 28 that is arranged at the tractor-end pivot of the lower link member 17 and include means for measuring a lifting mechanism angle that supplies signals characteristic of the position of the controller link device 12 and thus for its kinematics. The control unit 26 also receives a third signal of a pitch sensor 29 that is attached to the tractor 13 and thus measures the longitudinal inclination angle of the tractor 13 relative to the horizontal. The control unit 26 is connected in operation with an operating device 31, a display unit 32 and a data memory 33. The electronic control unit 26 is thus coordinated, on the one hand, with the electro-hydraulic lifting device control unit 14 and, on the other hand, with the device 10 for weight determination of a load so that it is equipped with suitable means for data processing and for relaying the data.

Figure 2:
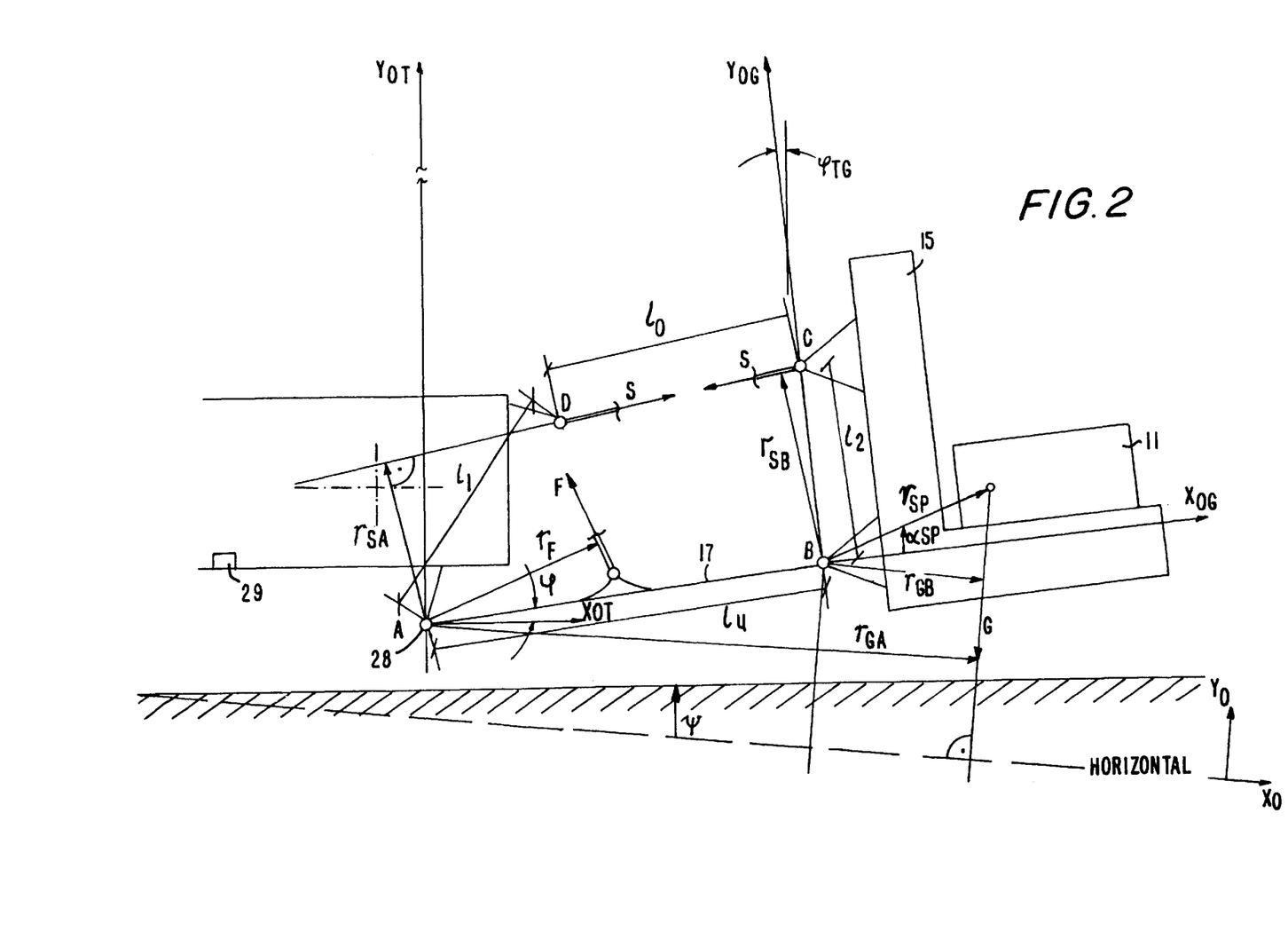
FIG. 2 is a diagrammatic representation of the kinematics and occurring forces of a portion of the device shown in FIG. 1a with a link device for the suspended load.

FIG. 2 is a simplified illustration of the kinematics of the controller link device 12 with the holder 15. The general kinematics corresponds to a four-bar link device with projection of the 3-point controller link device 12 on the plane including the long axis of the tractor 13 and its vertical axis. For a description of the state and forces in this four-bar link device the following terms are used.

| | |
|---|---|
| $x_0, y_0$ | world coordinate system |
| $x_{0T}, y_{0T}$ | tractor coordinate system |
| $x_{0G}, y_{0G}$ | weighing device or load holder coordinate system |
| $\phi$ | measured lower link member position angle relative to the tractor |
| $\phi_{TG}$ | angle between coordinate systems of the tractor and load holder 15 |
| $\psi$ | measured longitudinal inclination angle or pitch angle of the tractor to the horizontal |
| $\alpha_{SP}$ | angle between center-of-mass radius $r_{SP}$ relative to a second pivot point B and X-axis $x_{OG}$ of the load holder coordinate system |
| A,D | tractor-end first and third pivot points of the lower and upper link members respectively |
| B,C | weighing device or load holder second and fourth pivot points of the lower and upper link members |
| $l_u$ | length of the lower link member between pivot points A and B |
| $l_o$ | length of the upper link member between pivot points C and D |
| $l_1$ | distance between the tractor-end pivot points A and D |
| $l_2$ | distance between the weighing device-end pivot points B and C |
| F | force of the hydraulic cylinder depending on the measured pressure p in the hydraulic cylinder |
| S | force acting on the upper link member |
| G | resulting weight of the load holder or weighing device comprising the |

-continued

| | |
|---|---|
| $G_0$ | load empty weight of the weighing device load holder |
| $r_{SA}$ | action radius of the force S on the upper link member froin the first pivot point A |
| $r_{SB}$ | action radius of the force S on the upper link member froin the second pivot point B |
| $r_{GA}$ | action radius of the weight force G in relation to pivot point A |
| $r_{GB}$ | action radius of the weight G in relation to second pivot point B |
| $r_{SP}$ | radius of the center of mass relative to second pivot point B |
| $r_F$ | action radius of the lifting force F relative to the first pivot point A |
| $M_F$ | torque of the hydraulic cylinder relative to the first pivot point A |
| $G', r_{SP}', \alpha_{SP}' \ldots$ | estimated values of the concerned variables |
| e | estimated error |
| $M_{F, \psi, \phi}$ | vector representation of the concerned variables |
| n | number of measured displacements/ measured value estimates |
| $a_1, a_2, a_3, a_1'$ | substitution variables |
| <M>, <F> | average values of the concerned variables |

The link member dimensions $l_u$, $l_o$, $l_1$ and $l_2$ can be taken as known or to be determined without noteworthy efforts. The lifting device-link member position angle $\phi$ is further measured by the angle sensor 28 on the lower link member 17 during operation of an electro-hydraulic lifting device controller 14. The position of the pivot points A, B, C, D of the four-bar link device can be calculated at every time point or determined from a table prepared at one time. Likewise the coupling of the hydraulic cylinder 21 to the four-bar linkage of the controller link device 12 with the holder 15 by means of the lifting rod 18 is fixed by the structure of the tractor 13 and thus is known. Similarly at each time point the orientation and position of the force F of the hydraulic cylinder 21 on the controller link device 12 are given. With knowledge of the geometry and measurement of the hydraulic pressure in the hydraulic cylinder 21 then the torque produced by the hydraulic cylinder about an arbitrary point, for example the tractor-end pivot point A of the lower link member 17 can be determined.

The following formulation may be set up from a static consideration of the sum of the torque or forces acting on the lifting device for arbitrary lifting device configurations. The following equation (I) results for the the torque of the hydraulic cylinder 21 about the pivot point A:

$$M_F = r_F \cdot F \tag{I}$$

Furthermore the following equation (II) results from a consideration of all torque components about the pivot point A:

$$M_F + S \cdot r_{SA} - G \cdot r_{GA} = 0 \tag{II}$$

Also the following equation (III) results from a consideration of the torque about the pivot point B:

$$S \cdot r_{SB} - G \cdot r_{GB} = 0 \tag{III}$$

The equation IV may be derived from the equations II and III:

$$M_F + G\{(r_{GB}/r_{SB}) \cdot r_{SA} - r_{GA}\} = 0. \tag{IV}$$

The following equations (V) and (VI) are based on the kinematic relationships of the controller link device with the built-in holder 15:

$$r_{GB} = r_{SB} \cdot \cos(\alpha_{SP} + \psi + \phi_{TG}) \tag{V}$$

$$r_{GA} = r_{GB} + l_u \cdot \{\cos(\psi + \phi)\} \tag{VI}$$

From equation IV the following equation (VII) may be derived by replacement of the variables according to equations (V) and (VI):

$$M_{F+G}\{[(r_{SP}/r_{SB}) \cdot r_{SA} \cdot \cos(\alpha_{SP} + \psi + \phi_{TG})] - r_{SP} \cdot \cos(\alpha_{SP+\psi+\phi TG}) - l_u \cdot [\cos(\psi + \phi)]\} = 0. \tag{VII}$$

The following equation (VIII) may be derived from equation (VII) by rearrangement:

$$M_F + G\{r_{SP} \cdot \cos(\alpha_{SP} + \psi + \phi_{TG})\}\{r_{SA}/r_{SB} - 1\} - l_u \cdot \cos(\psi + \phi)\} = 0. \tag{VIII}$$

This equation (VIII) has only three unknown scalar variables because of observations of the inclination of the tractor 13 by the pitch sensor 29, of the customary conditions or requirements for the holder of the controller link device 12 and from static consideration of the sum of the torque and/or forces acting on the lifting device. The weight to be determined and its relative position relation to a certain point of the controller link device 12 may be determined from these three unknown scalar quantities G, $r_{SP}$ and $\alpha_{SP}$. It is advantageous when the weighing device-end pivot point B of the holder 15 on the lower link member 16 is selected as a reference point.

A relationship of this type according to the torque or force equilibrium exists for each arbitrary position of the controller link device 12 with connected holder 15 according to three signals from the pressure sensor 27, the angle sensor 28 and pitch sensor 29. A definite equation system for the three unknowns results is obtained by making measurements in at least three different measurement positions. This equation system can be solved either mathematically for the unknown variables or the values of the unknown variables can be obtained by numeric methods. The torque $M_F$ of the lifting force may be determined from the measured pressure of the pressure sensor 27 with the aid of the piston size in the hydraulic cylinder 21 and the radius $r_F$ fixed by the kinematics of the controller link device. Meanwhile the angle sensor 28 measures the lifting device-link member position angle $\phi$ and the pitch sensor 29 measures the pitch angle $\psi$. Thus the variables $r_{SB}$ and $r_{SA}$ and the angle $\phi_{TG}$ may be taken from a previously calculated table as mentioned above.

The determination of sets of measured values in the three different positions in quasi-stationary operation of the controller link device 12 occurs during repeated upward and downward motions in an advantageous manner. Thus it is sufficient when the total displacement range is traversed in order to obtain measured value sets for as many different positions as possible so that no linearly dependent sets of measured values arise.

Because of measurement errors always present in practice because of non-ideal characteristics of the sensors or quantization because of digitization of analog measurement values it is advantageous for determination of the unknown variables to refer to more than three measurement positions. The equation system is over-determined because of that. Then methods of parameter estimating theories can be used here. Also instead of the unknown variables G, $r_{SP}$ and $\alpha_{SP}$, estimated values G', $r_{SP}'$, $\alpha_{SP}' \ldots$ of the concerned variables are used in the over-determined equation system and an estimated error e is associated with each equation. The following equation (IX) results from the derivation of equation (VIII) so that:

$$\underline{M}_F + G'\{r_{SP}' \cdot \cos(\alpha_{SP}' + \underline{\psi} + \underline{\phi}_{TG})[\underline{r}_{SA}/\underline{r}_{SB} - 1] - l_u \cdot \cos(\underline{\psi} + \underline{\phi})\} + \underline{e} = 0. \quad \text{(IX)}$$

The vectors of the known variables $\underline{M}_F$, $\underline{\psi}$, $\underline{r}_{SA}$, $\underline{r}_{SB}$, $\underline{\phi}_{TG}$, $\underline{\phi}$ and $\underline{e}$ can be processed with equation (IX) with n measured value sets in order to obtain the unknown three variables from their estimated values $G'$, $r_{SP}'$, $\alpha_{SP}'$. Thus the estimated values of the three unknowns can be determined by minimization of the estimate errors, for example by minimization of the error quadratic sum according to equation (X):

$$(\underline{e})^2 \to \text{Min}, \quad \text{(X)}$$

which is known as the method of least squares. The effects of random errors are reduced because of the larger measured value sets.

When the unknown values of the weight G of the holder 15 including the load 11 and its center of gravity $r_{SP}$ and $\alpha_{SP}$ for the initial state are known, changes of the weight G, for example after application of fertilizer, can be approximately determined with the aid of the initial torque relationship for an arbitrary position of the controller link device 12. Also in practice only insignificant changes in the center of gravity position itself can occur ※ at least inside of definite bounds for the total weight of the holder 14 and the load 11. From this starting point a continuous determination of the weight is possible at arbitrary positions of the controller link device 12, at least section-wise. Next a repetition of the estimate of weight and center of gravity position is required when predetermined confidence limits are exceeded.

A transformation of the starting equations is advantageously when working with equations (VIII) and (XI), since these equations contain non-linear combinations of the unknown variables G, rsp and asp. Equations in which the unknown variables are coupled in a linear manner are preferred for direct calculations or for linear parameterization estimates. In order to achieve this the following transformations are advantageous. Also the application of addition theorems for the cosine function such as the following equation (XI) are useful.

$$\cos(\alpha + \beta) = \cos \alpha \cdot \cos \beta - \sin \alpha \cdot \sin \beta \quad \text{(XI)}$$

In this way equation (VIII) is transformed using the following expression (XII) derived from the cosine relationship (XI):

$$\cos(\alpha_{SP} + \psi + \phi_{TG}) = \cos \alpha_{SP} \cos(\psi + \phi_{TG}) - \sin \alpha_{SP} \sin(\psi + \phi_{TG})$$

When equation (VIII) is divided by G, the addition theorem according to equation (XII) is used and the following substitutions (XII') in which the following terms $a_1$, $a_2$ and $a_3$ are defined approximately in an intermediary step, $$1/G = a_1$$

$$r_{SP} \cdot \cos \alpha_{SP} = a_2$$

$$-r_{SP} \cdot \sin \alpha_{SP} = a_3, \quad \text{(XII')}$$

an approximately linear equation (XIII) in the unknown variables $a_1$, $a_2$ and $a_3$ results:

$$a_1 M_F + a_2 \cdot \cos(\psi + \phi_{TG})\{r_{SA}/r_{SB} - 1\} + a_3 \cdot \sin(\psi + \phi_{TG}) \{r_{SA}/r_{SB} - 1\} - l_u \cdot \cos(\psi + \phi) = 0 \quad \text{(XIII)}$$

This equation (XIII) can be easily solved analytically or is suitable for linear parameter estimates. An equation (XIII) thus results with linear unknown variables $a_1$, $a_2$ and $a_3$. The substituted variables can be calculated directly from it.

For direct parameter estimations one proceeds in the same manner. Also here the estimated values of the intermediate variables can be directly calculated with the aid of a linear parameter estimating theory based on arbitrarily many measured value sets, and also with n>3.

Figure 3A:
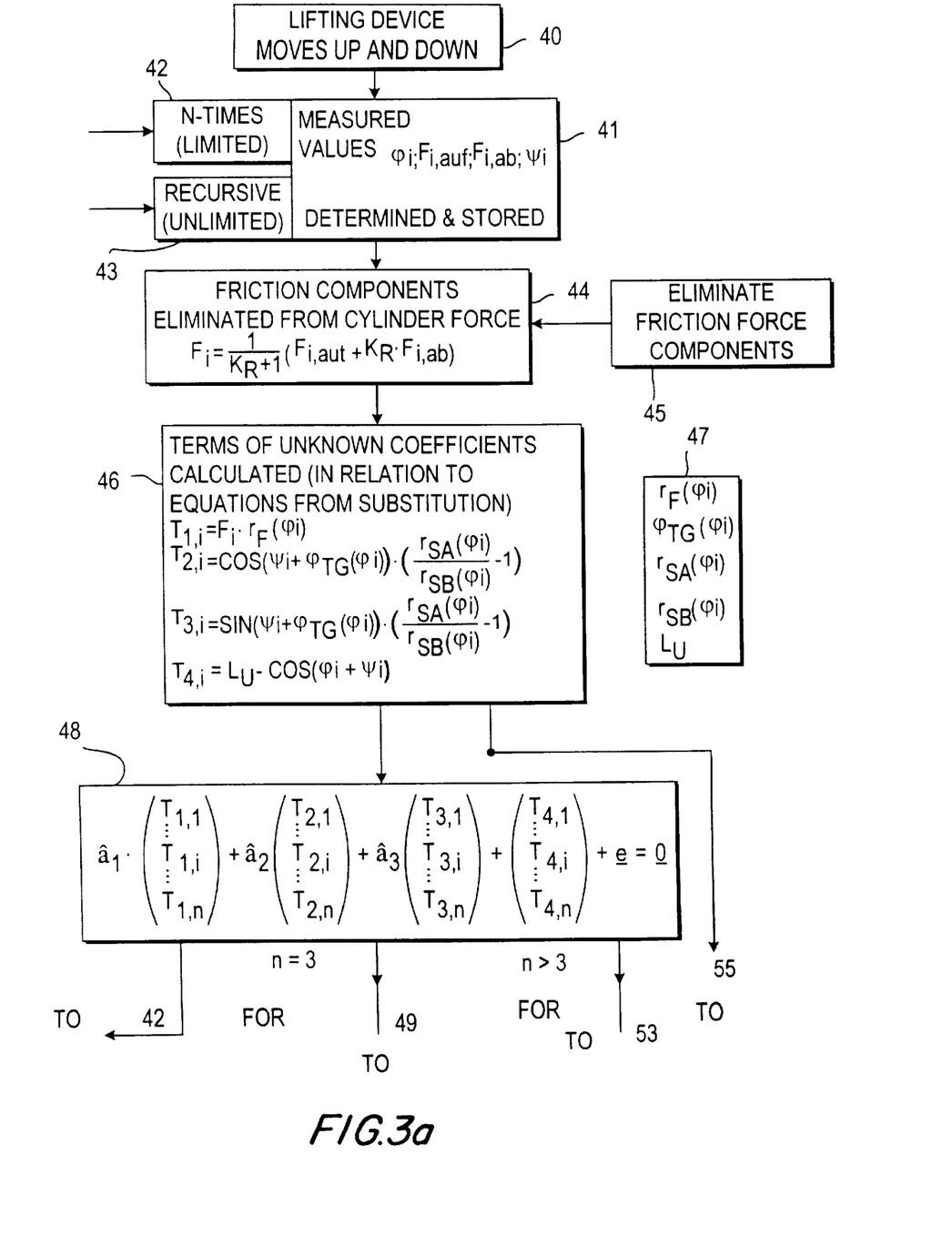
FIGS. 3a, 3b and 3c are portions of a flow diagram for the process of weight determination of a suspended load occurring in the device of FIG. 1.
Figure 3B:
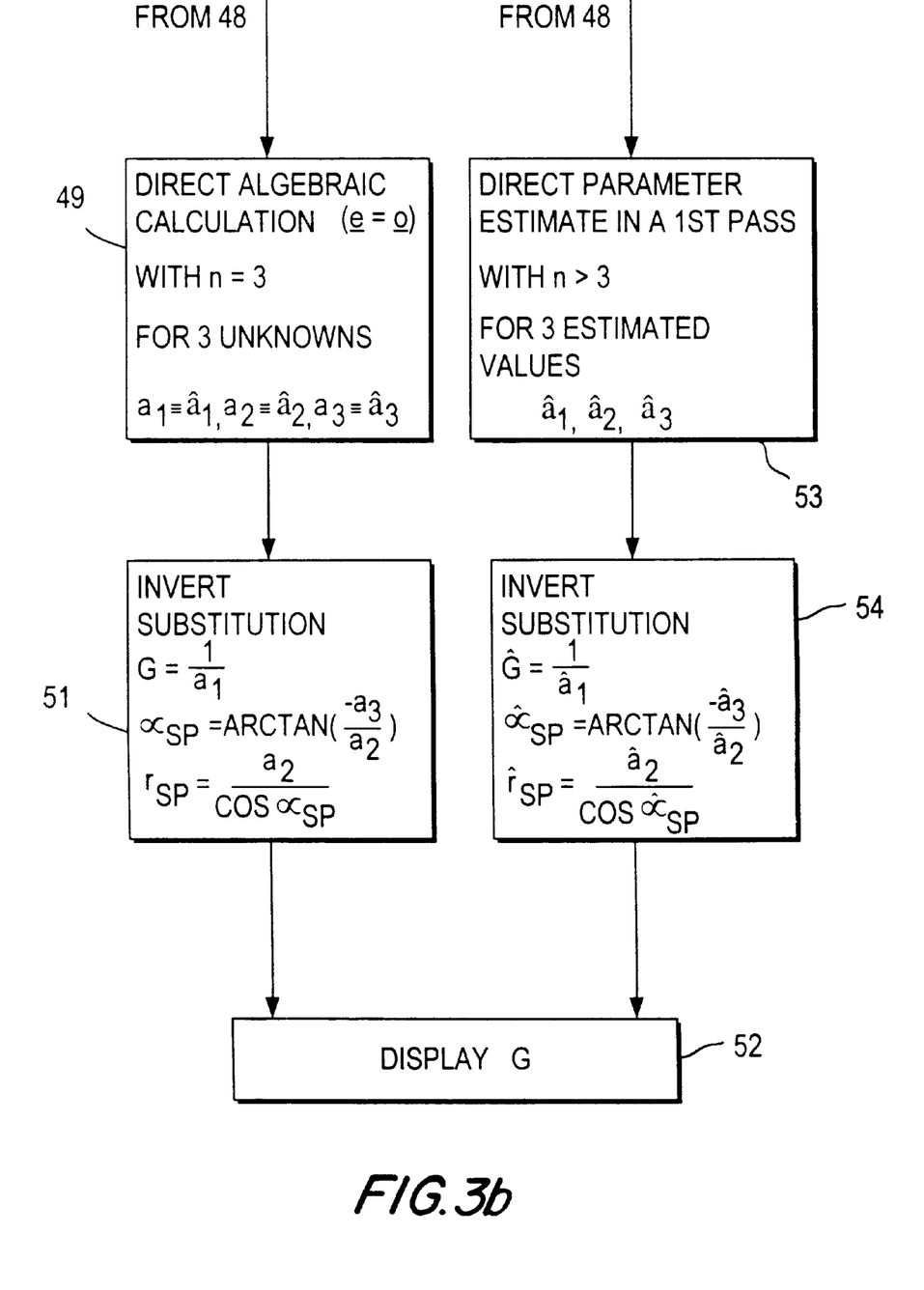
Figure 3C:
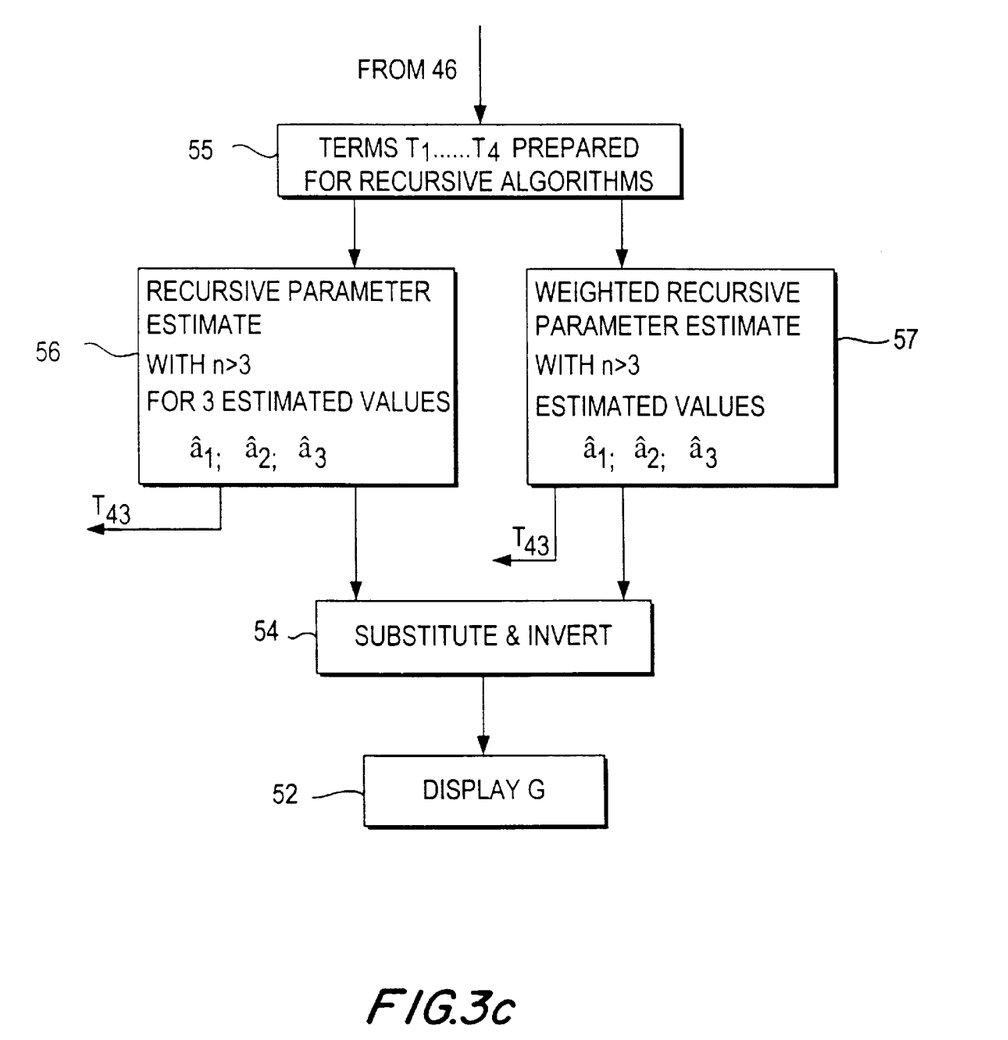

The method for determining the weight G is now illustrated with the aid of a greatly simplified flow chart in FIGS. 3a, 3b and 3c. In a first step 40 the lifting device 14 moves up and down with a generally fixed speed. The pressure in the hydraulic cylinder or the force produced by it during the up and down or to and fro motions is measured, the angular displacement φ of the lifting device is measured by means of the angular displacement sensor 28 and the pitch angle ψ is measured by means of the pitch sensor 29 in the step 41, for example, for a preset number of measured value sets or also any arbitrarily large number of such measured value sets. The measured value sets of the pressure, angular displacement φ and pitch angle ψ are also stored in step 41. This step 41 can be performed with a fixed number of displacements n according to step 42 or in a recursive method with an unlimited number of displacements of the lifting device according to step 43. Subsequently the friction force components of the lifting force are eliminated in step 44. The steps required for elimination of the friction force components are represented symbolically by intermediate step 45 and will be explained further hereinbelow. The terms $T_1$ to $T_4$ for the unknown coefficients $a_1$, $a_2$ and $a_3$, which are derived from the equation (XIII), are obtained in step 46. The parameters for calculation of the terms $T_1$ to $T_4$ are input during an initialization in the step 47. In this initialization an interpolation can be performed from a Table or a computation from a polynomial approximation or also a direct calculation can be performed. The terms obtained in step 46 can be processed according to the equation system which is derivable from equation (XIII) in the step 48. A direct algebraic calculation is finally performed in step 49 in which measured value sets corresponding to three different measurement displacements are used in three equations for three unknowns. The estimated error e is set at zero. Estimated variables $â_1$, $â_2$ and $â_3$ corresponding to the substitution variables $a_1$, $a_2$ and $a_3$ result from this direct computation according to step 49. In step 51 these substitution variables are again inverted to obtain the unknown variables G, $r_{SP}$ and $\alpha_{SP}$. These unknown variables are displayed or output in step 52.

For the case in which the number of measured displacements and thus sets of measured values is selected to be larger than 3, a direct parameter estimate in a single step is performed. As already mentioned the least squares method in which the sum of the square of the estimate error is minimized can be used. In this way estimated values $â_1$, $â_2$ and $â_3$ of the three unknown variables $a_1$, $a_2$ and $a_3$ are obtained. Also the in parameter estimate process in the subsequent step 54 after the insertion of these variables in the set of equations the desired estimated values of the weight and the center-of-mass position are determined and subsequently displayed in step 52.

The possibility of using a recursive parameter estimating method has resulted from the transformation and resulting linearization of the equations. For this case the terms $T_1$ to $T_4$ derived in step 46 are prepared in step 55 for the recursion algorithms. In the subsequent step 56 a recursive parameter estimate is performed, which always produces new, improved or actualized estimated values of the variables $a_1$, $a_2$ and $a_3$. Then after passing through the substitution equations the desired values can be determined in step 54 and displayed in step 52. For step 56, in which similarly the number of measured displacements n is greater than 3, the above-mentioned method of least squares may be used for the determination of the three unknowns. Instead of step 56 also the terms of step 56 can be processed in step 57 in which a weighted recursive parameter estimate is performed. In this procedure actual stable values are weighted more strongly than previous values so that actual estimated values for the three unknowns $â_1$, $â_2$ and $â_3$ are provided. This allows an adaptive estimate of time varying variables. It is also possible to estimate a continuously changing weight G, also during travel and during weight changes. The estimates for the other parameters may be constant of changing. The resulting variables from step 57 are produced from the substitution equations of step 54 and subsequently displayed in step 52.

Several variables that result from the known structural conditions or geometric lengths produced by assembly of the holder 15, namely the variables $l_1$, $l_2$, $l_o$, $l_u$ and $r_F$ dependent on $\phi$, are prepared for initialization of the calculation process. Also subsequent values in the angular range $\phi_{min} \leq \phi_i \leq \phi_{max}$ are assembled in a Table, namely $\phi_i$, $r_{SB}(\phi_i)$, $r_{SA}(\phi_i)$, $\phi_{TG}((\phi_i)$ and $r_F((\phi_i)$. Usually the variables $r_F(\phi_i)$ and $l_u$ are fixed on the mechanism side of the tractor 13. The lengths $l_1$, $l_2$ and $l_o$ can be measured. In order to calculate or estimate the weight G, the center of gravity $r_{SP}$ and $\alpha_{SP}$ of the holder 15, the above-named variables prepared for arbitrary angular position $\phi_i$, those values can be advantageously calculated by interpolation or after a piecewise approximation.

In order to be able to eliminate the friction force components from the cylinder force F in step 44, a prior calibration of the force measurement is required in step 45 which measures and evaluates the force components of the hydraulic cylinder 21. Real hydraulic cylinder usually have direction-dependent friction. The exteriorly directed hydraulic cylinder force differs from the true lifting force in the pressurized cylinder 21 by about this direction dependent friction force. Indeed the sum of the friction force components may be determined by measurement of the force hysteresis during upward and downward displacement. The true size of the cylinder force F is, in contrast, not known at first.

Figure 4:
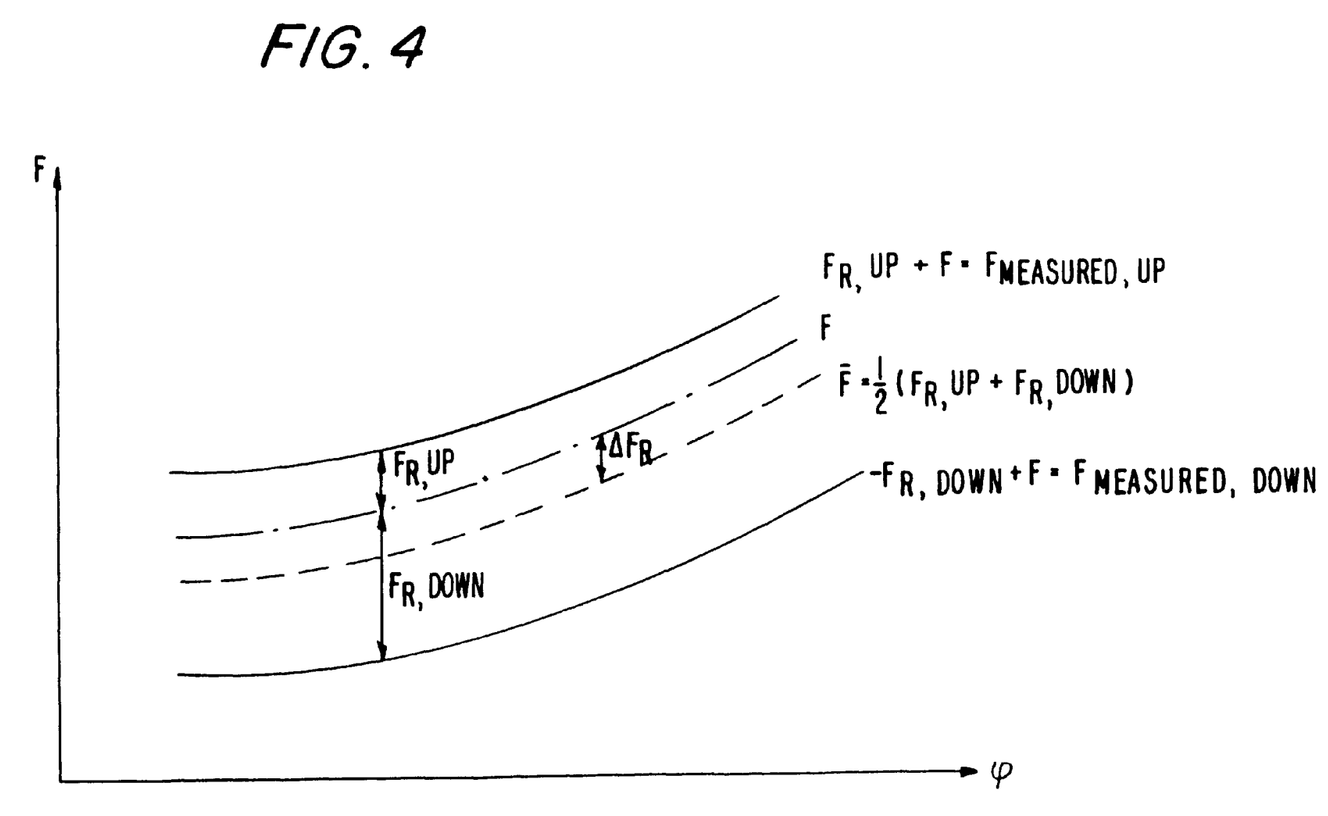
FIG. 4 is a graphical illustration of the effect of friction on the dependence of the force from the displacement cylinder on the displacement position angle.

In order to determine and evaluate now the direction dependence of the friction in the hydraulic cylinder, in contrast to the above-described method for determination of the unknown variables, weight and center-of-mass position, now the previously unknown size of the empty weight $G_0$ of the holder 25 is derived at an arbitrary position of the controller link device 12 in a calibration measurement. The pressure in the hydraulic cylinder 21 is measured with upwards and downwards motion with the aid of pressure sensor 27, $F_{up}$, $F_{down}$ at an arbitrary lifting device-link member position angle $\phi$. The friction forces $F_{R,up}$, $F_{R,down}$ in the hydraulic cylinder 21 and the location of the holder center of mass are unknown. The method is summarized in detail in FIG. 4, in which the dependence of the displacement force F on the angular position $\phi$ is illustrated in a simple manner. The variation $\Delta F_R$ of the true force F from the average value $<F>$ of the measured cylinder force is introduced as an additional unknown variable. Because of that equations may again be set up with three unknowns, in this case however the center of gravity position and the above-mentioned differences between the size of the friction forces during upward and downward motion.

Figure 5:
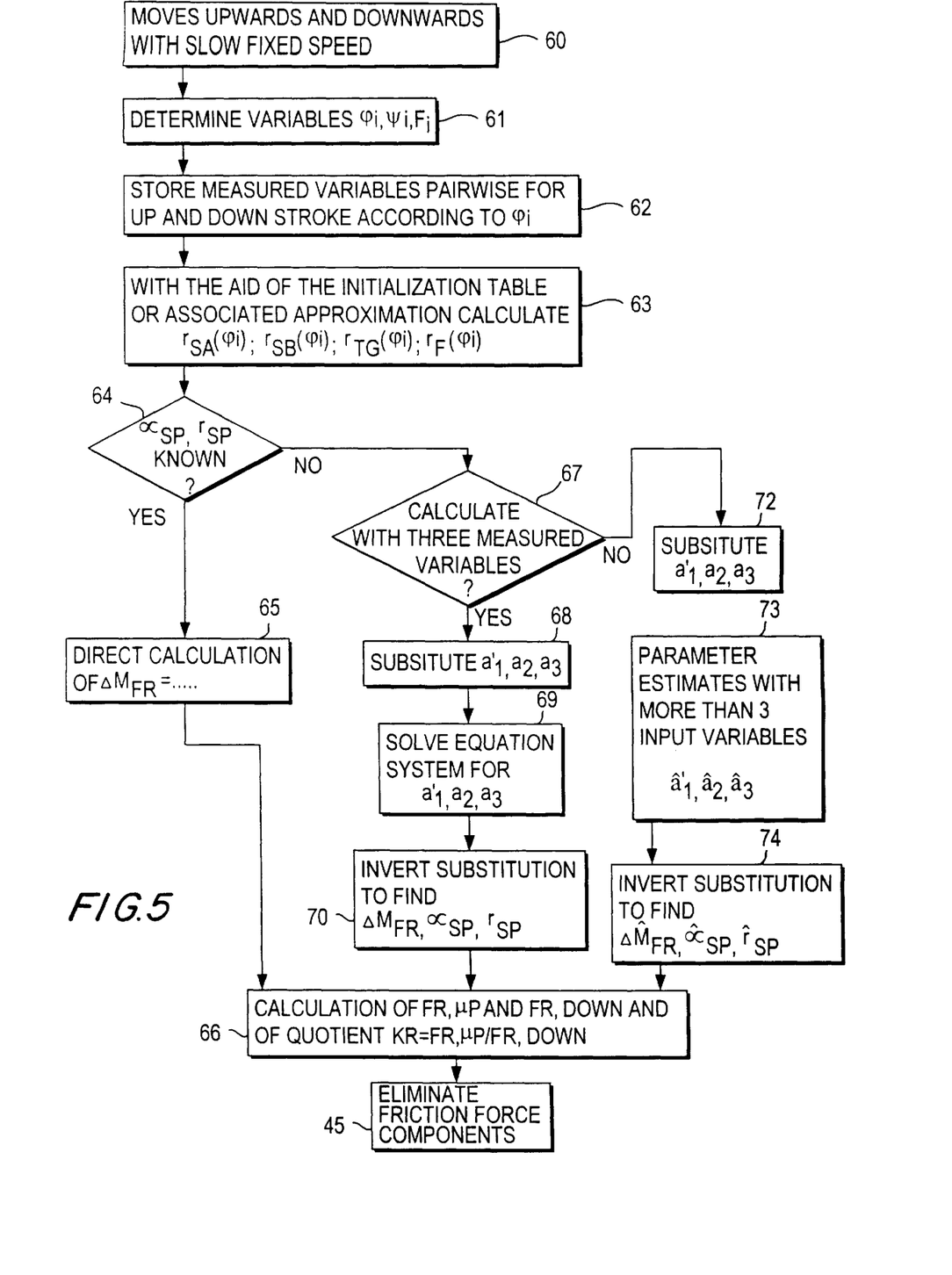
FIG. 5 is a simplified flow chart for a method of determining the effect of friction on the weight determination.

FIG. 5 is a simplified flow chart of a method for determining the direction dependence of the friction which was simplified as a single step 45 in FIG. 3. The controller link device 12 is moved up and down to vary the lifting device-link member position angle $\phi$ in step 60 of FIG. 5. This occurs with largely constant speed in order to avoid dynamic force components. The measured variables, especially $\phi$, $\psi$ and F, are determined in step 61. The determination of the hydraulic cylinder force F happens pairwise during upward and downward motion with the help of the pressure in the hydraulic cylinder 21 considering its piston surface and arbitrary angular position $\phi_i$. The cylinder forces $F_{measured, up}(\phi_i)$, $F_{measured, down}(\phi_i)$, depending on the angle $\phi_i$ are determined and then stored pairwise in step 62. For each $\phi_i$ a calculation according to the equation:

$$<F(\phi_i)> = (1/2) \cdot \{F_{measured, up}(\phi_i) + F_{measured,down}(\phi i)\}. \quad (XIV)$$

The pairwise processing of sets of measured values during equal, but otherwise arbitrary angular displacements in upward and downward motion allows the compilation of the variables. In this connection the following equation (XV) is useful:

$$F = <F> + \Delta F_R. \quad (XV)$$

In this connection the following equation (XVI) is also useful:

$$M_F = <M_F> + \Delta M_{FR}. \quad (XVI)$$

In this connection the following equation (XVII) is also useful:

$$<M_F(\phi_i)> = <F(\phi_i)> \cdot r_F(\phi_i). \quad (XVII)$$

From a relationship for the torque balance in the calibration process derived from equation (VIII), the variable $\Delta M_{FR}$ can be calculated from the following equation (XVIII):

$$\Delta M_{FR} = -\{<M_F(\phi_i)> + G[r_{SP} \cdot (\cos(\alpha_{SP} + \psi + \phi_{TG}))(r_{SA}/r_{SB} - 1) - l_u \cdot \cos(\psi + \phi)]\}.$$

This equation (XVIII) contains only three unknowns, namely $\Delta M_{FR}$, $r_{SP}$ and $\alpha_{SP}$.

The variables required for solution of equation (XVIII) are now prepared in step 63 of FIG. 5 in a manner comparable to that of step 47 with the aid of an initialization table.

In the special case when the center-of-mass position, namely $\alpha_{SP}$, $r_{SP}$ of the weight $G_0$, of the empty holder 15 is now known in relation to the weighing device-end coordinate system $(x_{OG}, y_{OG})$, a direct computation of the variable $\Delta M_{FR}$ can be made according to equation (XVIII) in step 65. In the additional step 66 the friction force component $F_{R,up}$ and $F_{R,down}$ as well as the quotient $k_R$ is calculated. The friction force components of the cylinder force can then be eliminated in step 44 with these variables.

If the center-of-mass position of the empty holder is not known, thus at least three sets of measured values are required for the variable $\Delta M_{FR}$ in order to perform a calculation according to step 68 and following. Also in a similar manner as in the weight determination for computation of the unknown variables a substitution is again used in step 68 in which $$a_1 = \Delta M_F / G;$$

$$r_{SP} \cdot \cos \alpha_{SP} = a_2;$$

$$-r_{SP} \cdot \sin \alpha_{SP} = a_3.$$

After substitution the equation (XIX) results:

$$a_1' + a_2 \cdot \cos(\psi_i + \phi_{TG})\{r_{SA}/r_{SB} - 1\} + a_3 \cdot \sin(\psi_i + \phi_{TG})\{r_{SA}/r_{SB} - 1\} -$$

$$l_u \cdot \cos(\psi_i + \phi_i) + <M_F \phi_i>/G = 0 \quad \text{(XIX)}$$

and the variables $a_1'$, $a_2$ and $a_3$ can be solved according to step 69. In the following step 70 this substitution is inverted so that the variables $\Delta M_{FR}$, $\alpha_{SP}$ and $r_{SP}$ may be calculated. The step 66 can be performed with these variables from the step 70 in order to determine the exact friction-dependent variables.

If more than three measured value sets are present in step 67, in a comparable manner as in the weight determination a parameter estimate can be performed. A substitution is used again and the variables $a_1'$, $a_2$ and $a_3$ are introduced. The actual parameter estimate is performed with more than three measured value sets in the following step 73, in which the estimated values $\hat{a}_1$, $\hat{a}_2$ and $\hat{a}_3$. The substitution is inverted or reversed in the subsequent step 74 which provides the estimated values of the variables $\Delta M_{FR}$, $\alpha_{SP}$ and $r_{SP}$. A calculation of the friction-dependent variables is again performed with these variables subsequently in step 66.

Understandably changes may be made in the various embodiments and methods without changing the conception of the invention. Although the device for weight determination is especially advantageous in an electro-hydraulic link device, it is possible to use it in other machines and apparatus in which comparable behavior is present, such a wheel loader, front loader, etc. An advantageous method is of course provided for calculation of the position of the center of mass of the load with the help of the variables, angle and radius; the center of mass can also be determined and given in any arbitrary coordinate system. In order to reduce the engineering expense as needed with reduced accuracy only two unknowns may be used instead of three. In this latter situation a component of the center-of-mass position ($r_{SP}$, $\alpha_{SP}$) is given a fixed unchanging value and considered known. A reduction of expenses is also possible if the inclination sensor is eliminated with some reduction in accuracy.

The disclosure in German Patent Application 197 31 089.3 of Jul. 19, 1997 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a device for determination of the weight of a load, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A device for determining a weight of a load in a working vehicle, said device comprising means for upward and downward displacement of the load comprising a hydraulic cylinder (21) and a link device (12), said link device including link members (16,17) and a holder (15) for the load, said link device connecting the load with the working vehicle and being operable by means of the hydraulic cylinder (21) so that a height of the load is adjustable;

pressure sensor means for determining hydraulic pressures in the hydraulic cylinder, said pressure sensor means comprising only one load-dependent sensor (27) for generating pressure signals depending on said hydraulic pressures and thus said load;

position sensor means for determining positions of the link device relative to the working vehicle and for generating position signals depending on said positions; and processor means (26) for determining respective sets of measured variables from said pressure signals and said position signals in at least two different measurement positions of said link device (12) and for determining at least one unknown value for a weight (G) of said load and at least one unknown value for a center-of-mass position ($r_{SP}$, $\alpha_{SP}$) of said load from said respective sets of said measured variables;

wherein said processor means (26) includes means for determining the at least one unknown value of the weight and the at least one unknown value of the center-of-mass from the pressure and position signals in said at least two measurement positions and from predetermined geometric dimensions of said link device (12) and said holder by means of an equation for equilibrium of forces and torque acting on one of the link members of the link device.

2. The device as defined in claim 1, wherein said processor means (26) inputs one of said pressure signals and one of said position signals in at least three different measurement positions of the link device (12) in order to determine said unknown values of said weight (G) and said center-of-mass position ($r_{SP}$, $\alpha_{SP}$) of said load.

3. The device as defined in claim 1, further comprising a pitch sensor (29) for detecting a longitudinal inclination of the working vehicle and said pitch sensor (29) includes means for generating third signals for said processor means (26) for determining said unknown values of said weight (G) and said center-of-mass position ($r_{SP}$, $\alpha_{SP}$) of said load in addition to said pressure signals and said position signals.

4. The device as defined in claim 1, wherein said equation for equilibrium of forces and torque on said one of the link members of the link device is of the formula (VIII):

$$M_F + G\{r_{SP} \cdot \cos(\alpha_{SP} + \psi + \phi_{TG})\}\{r_{SA}/r_{SB} - 1\} - l_u \cdot \cos(\psi + \phi)\} = 0; \quad \text{(VIII)}$$

wherein G is the weight of the load, $M_F$ is a torque of the hydraulic cylinder around a first pivot point A, $\phi$ is a measured lower link member position angle relative to the working vehicle, $\phi_{TG}$ is an angle between coordinate systems for working vehicle and load holder or weighting device, $\psi$ is a measured longitudinal inclination angle or pitch angle of the working vehicle relative to horizontal, $r_{SP}$ is a radius of the center of mass of the load relative to a second pivot point B, $\alpha_{SP}$ is an angle between a center-of-mass radius $r_{SP}$ and an X-axis $x_{OG}$ of a load holder- or weight device-coordinate system, $l_u$ is a length of a lower one of the link members between the first pivot point A and the second pivot point B, $r_{SA}$ is an action radius of force S on an upper one of the link members from the first pivot point A and $r_{SB}$ is an action radius of force S on the upper link member from the pivot point B.

5. The device as defined in claim 4, wherein said processor means includes means for determining direction-dependent friction force components in said hydraulic cylinder (21) and eliminating effects of said friction force components on said determination of said weight.

6. The device as defined in claim 4, wherein said equation for said equilibrium of forces and torque on said one of the link members of the link device for determination of said at least two unknown values for said weight (G) and for the center-of-mass position ($r_{SP}$, $\alpha_{SP}$) of said load is transformed, prior to said determination, to a linearized equation of the formula (XIII):

$$a_1 M_F + a_2 \cdot \cos(\psi + \phi_{TG})\{r_{SA}/r_{SB} - 1\} + a_3 \cdot \sin(\psi + \phi_{TG})\{r_{SA}/r_{SB} - 1\} - l_u \cdot \cos(\psi + \phi) = 0;$$

wherein $a_1 = 1/G$ $a_2 = r_{SP} \cdot \cos \alpha_{SP}$ and $a_3 = -r_{SP} \cdot \sin \alpha_{SP}$.

7. The device as defined in claim 6, further comprising means for recursive parameter estimation to determine said at least two unknown values for said weight (G) and for the center-of-mass position ($r_{SP}$, $\alpha_{SP}$) of said load.

8. The device as defined in claim 1, further comprising an electro-hydraulic lifting device controller (14) with a three-point control linkage in the working vehicle and wherein said link device (12) comprises said three-point control linkage.

9. The device as defined in claim 8, wherein said working vehicle is a tractor.

10. A method of determining a weight of a load in a working vehicle, said method comprising the steps of:

a) providing means for upward and downward displacement of the load comprising a hydraulic cylinder (21) and a link device (12), said link device including link members and a holder (15) for the load, said link device connecting the load with the working vehicle and being operable by means of the hydraulic cylinder (21) so that a height of the load is adjustable;

b) generating pressure signals according to hydraulic pressures in the hydraulic cylinder, and thus the load, by means of only one pressure sensor;

c) generating position signals according to positions of the link device relative to the working vehicle by means of a position sensor;

d) determining respective sets of measured values from said position and said pressure signals produced in at least two different measurement positions of the link device; and e) determining at least one unknown value for a weight (G) of said load and at least one unknown value for a center-of-mass position ($r_{SP}$, $\alpha_{SP}$) of said load from said respective sets of said measured values in said at least two different measurement positions and from predetermined geometric dimensions of said link device with said holder by means of an equation for equilibrium of forces and torque acting on one of the link members of the link device.

11. The method as defined in claim 10, wherein said pressure signals and said position signals are determined in at least three different measurement positions of the link device (12) for determination of said unknown values of said weight (G) and said center-of-mass position ($r_{SP}$, $\alpha_{SP}$) of said load.

12. The method as defined in claim 11, further comprising generating third signals ($\psi$) according to a longitudinal inclination of the working vehicle by means of a pitch sensor (29) and using said third signals as well as said position signals and said pressure signals for determining said unknown values of said weight (G) and said center-of-mass position ($r_{SP}$, $\alpha_{SP}$) of said load.

13. The method as defined in claim 10, further comprising eliminating effects of direction-dependent friction force components in the hydraulic cylinder 21 from said pressure signals.

14. The method as defined in claim 10, further comprising using a substitution process to linearize said equation for equilibrium of forces and torque for determination of said unknowns.

15. The method as defined in claim 10, wherein the unknown values of said weight (G) and said center-of-mass position ($r_{SP}$, $\alpha_{SP}$) of said load are determined by direct algebraic computation.

16. The method as defined in claim 10, wherein the unknown values of said weight (G) and said center-of-mass position ($r_{SP}$, $\alpha_{SP}$) of said load are determined by parameter estimation methods.

17. The method as defined in claim 16, wherein the parameter estimation methods include direct parameter estimates.

18. The method as defined in claim 16, wherein the parameter estimation methods include recursive parameter estimates.

19. The method as defined in claim 16, wherein the parameter estimation methods include weighted recursive parameter estimates.

20. The method as defined in claim 10, wherein said link device (12) is a three-point control linkage of an electro-hydraulic lifting device controller (14) in the working vehicle, said working vehicle is a tractor, and further comprising measuring a pitch angle of said tractor by means of a pitch sensor (29) provided in said electro-hydraulic lifting device controller.

* * * * *